UNITED STATES PATENT OFFICE.

EDWIN L. SIMPSON, OF BRIDGEPORT, CONNECTICUT, ASSIGNOR TO SIMON STEVENS, OF NEW YORK CITY.

IMPROVEMENT IN THE PROCESS OF MANUFACTURING INDIA-RUBBER, GUTTA-PERCHA, &c.

Specification forming part of Letters Patent No. 46,610, dated February 28, 1865.

*To all whom it may concern:*

Be it known that I, EDWIN L. SIMPSON, of Bridgeport, in the county of Fairfield and State of Connecticut, have invented a new and useful Improvement in the Process of Manufacturing India-Rubber, Gutta-Percha, and other Similar Gums; and I do declare the following to be a full, clear, and exact description of the same.

The object of my invention is to produce an india-rubber or gutta-percha manufacture free from the unpleasant odor and deleterious effects of vulcanized india-rubber; and my process consists in employing a concentrated preparation of sulphur and linseed or other similar vegetable oil and combining this concentrated preparation with india-rubber, gutta-percha, or other similar gum or gums and some oxide or carbonate of lead, lamp-black, paris-white, or any other coloring-matter or substance usually employed, avoiding such as have no offensive odor.

To enable others skilled in the art to put in practice my improvement, I will proceed to fully describe my manner of doing it.

I first boil the oil to about the consistency of honey. Then to each quart of oil so boiled I add about one pound of sulphur, carefully subjecting them to a moderate heat, sufficient only to cause the two substances to pass from a fluid or semi-fluid to an elastic or doughy substance. A compound is thus formed which, when mixed with rubber, gutta-percha, or other similar gum or gums in the usual manner, and added thereto, and subjected to a sufficient regulated heat, will produce a substance entirely free from the disagreeable odor and deleterious effects of vulcanized india-rubber and gutta-percha, and will produce a manufacture adapted to all the uses thereof.

In the preparation of the rubber compound I find by experiment the following to be about the proper proportions: in curing or preparing for dry heat, one pound of india-rubber or gutta-percha, two ounces of my compound, and eight ounces of litharge. If the color desired be black, two to three ounces of lamp-black are added, or, if other colors be desired, the proper coloring materials are to be added.

To reduce the cost of the preparation, or rather to increase the quantity at a small additional cost, I add about eight ounces whiting or other substitutes and mix all together in the usual manner by grinding together between warm rolls. If not for dry heat, the litharge may be left out.

When properly prepared as described, I apply the preparation to fabrics, or whatever it is designed to coat, in the usual manner of applying similar compounds, or, if desired to use it independent of fabrics, &c., roll it into sheets, when it may be cut and fashioned in a similar manner to ordinary india-rubber, gutta-percha, or other similar gum or gums. It is applicable to all uses for which vulcanized goods are adapted, and many more, owing to the absence of the unpleasant odor and other deleterious effects of sulphur.

Having thus fully described my invention, which I claim as new and useful, and desire to secure by Letters Patent, is—

1. The within-described compound of vegetable oil and sulphur, prepared substantially as and for the purposes specified.

2. The manufacture or preparation produced by combining the within-described compound with india-rubber, gutta-percha, or other similar gum or gums, substantially as and for the purposes specified.

EDWIN L. SIMPSON.

Witnesses:
AMOS S. TREAT,
H. T. BLAKE.